US008867995B2

(12) United States Patent
Kim et al.

(10) Patent No.: US 8,867,995 B2
(45) Date of Patent: Oct. 21, 2014

(54) APPARATUS AND METHOD FOR HUMAN BODY COMMUNICATION IN A MOBILE COMMUNICATION SYSTEM

(75) Inventors: Ki-Uk Kim, Suwon-si (KR);
June-Hyeok Im, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1258 days.

(21) Appl. No.: 12/266,798

(22) Filed: Nov. 7, 2008

(65) Prior Publication Data
US 2009/0124282 A1 May 14, 2009

(30) Foreign Application Priority Data
Nov. 8, 2007 (KR) ........................ 10-2007-0113509

(51) Int. Cl.
*H04B 13/02* (2006.01)
*H04B 13/00* (2006.01)
*H04M 1/725* (2006.01)

(52) U.S. Cl.
CPC ........ *H04M 1/7253* (2013.01); *H04M 2250/22* (2013.01); *H04B 13/005* (2013.01)
USPC .... 455/41.2; 455/456.1; 455/416; 455/422.1; 455/414.2; 345/163; 345/778; 345/174; 345/173; 345/473; 709/201; 709/228; 709/248; 709/203; 709/229

(58) Field of Classification Search
USPC ............... 455/41.2, 456.1, 416, 422.1, 414.2; 345/163, 1.2, 174, 173, 473, 778, 1.3; 709/201, 228, 248, 203, 229
See application file for complete search history.

(56) References Cited

U.S. PATENT DOCUMENTS

| | | | | | |
|---|---|---|---|---|---|
| 5,265,252 | A | * | 11/1993 | Rawson et al. | 719/326 |
| 5,880,743 | A | * | 3/1999 | Moran et al. | 345/473 |
| 5,923,757 | A | * | 7/1999 | Hocker et al. | 345/156 |
| 6,118,882 | A | * | 9/2000 | Haynes | 381/374 |
| 6,545,669 | B1 | * | 4/2003 | Kinawi et al. | 345/173 |
| 6,754,472 | B1 | * | 6/2004 | Williams et al. | 455/100 |
| 7,202,773 | B1 | * | 4/2007 | Oba et al. | 340/5.8 |
| 7,542,720 | B2 | * | 6/2009 | Yoda et al. | 455/41.1 |
| 7,636,794 | B2 | * | 12/2009 | Ramos et al. | 709/248 |
| 7,822,983 | B2 | * | 10/2010 | Aull et al. | 713/172 |
| 8,253,693 | B2 | * | 8/2012 | Buil et al. | 345/173 |
| 8,593,672 | B2 | * | 11/2013 | Aoyama et al. | 358/1.15 |
| 2004/0019571 | A1 | * | 1/2004 | Hurwitz et al. | 705/65 |
| 2004/0246372 | A1 | * | 12/2004 | Megeid | 348/384.1 |
| 2006/0180006 | A1 | * | 8/2006 | Kim | 84/609 |
| 2007/0050054 | A1 | * | 3/2007 | Sambandam Guruparan et al. | 700/65 |
| 2007/0237170 | A1 | * | 10/2007 | Proctor et al. | 370/462 |
| 2008/0020706 | A1 | * | 1/2008 | Payne et al. | 455/41.2 |
| 2008/0188240 | A1 | * | 8/2008 | Feher | 455/456.1 |

(Continued)

FOREIGN PATENT DOCUMENTS

KR  10-2006-0032482 A  4/2006
KR  10-2006-0064472 A  6/2006

*Primary Examiner* — Ganiyu A Hanidu
(74) *Attorney, Agent, or Firm* — Cha & Reiter, LLC.

(57) ABSTRACT

An apparatus and method for human body communication in a mobile communication system are provided. A portable terminal includes a human body communication module and a controller. The human body communication module performs human body communication. The controller performs a process to perform connection with an external device through the human body communication and then perform an operation executable through the human body communication.

13 Claims, 6 Drawing Sheets

(56) References Cited

U.S. PATENT DOCUMENTS

| | | | |
|---|---|---|---|
| 2008/0198138 A1* | 8/2008 | McFarlane et al. | 345/173 |
| 2008/0266257 A1* | 10/2008 | Chiang | 345/163 |
| 2008/0309625 A1* | 12/2008 | Krah et al. | 345/173 |
| 2008/0309628 A1* | 12/2008 | Krah et al. | 345/173 |
| 2009/0225036 A1* | 9/2009 | Wright | 345/173 |
| 2011/0102369 A1* | 5/2011 | Thorn | 345/174 |

\* cited by examiner

APPARATUS AND METHOD FOR HUMAN BODY COMMUNICATION IN A MOBILE COMMUNICATION SYSTEM

CLAIM OF PRIORITY

This application claims the benefit of the earlier filing date, pursuant to 35 U.S.C. §119(a), to that Korean Patent Application filed in the Korean Intellectual Property Office on Nov. 8, 2007 and assigned Serial No. 10-2007-0113509, the contents of which are herein incorporated by reference.

BACKGROUND OF THE INVENTION

1. Field of the Invention

The present invention relates to an apparatus and method for performing communication connection with a portable device in a portable terminal. More particularly, the present invention relates to an apparatus and method for performing communication connection with a portable device through a human body communication in a portable terminal.

2. Description of the Related Art

In recent years, researches have been conducted for a human body communication link for exchanging information through the body as a medium using the genetic characteristics of the body instead of a wired or wireless communication medium or link. The human body communication link has an advantage of being capable of providing a user convenience that a user can instinctively select a Mobile Station (MS) intended for communication.

Recently, as society approaches an ubiquitous age enabling anytime, anywhere information exchange, a Personal Area Network (PAN) in which a person collects and processes a variety of data from a portable terminal around is highlighted. A personal area terminal, that is, a portable terminal that a person directly carries or comes in contact around tends to increase in number. Thus, information exchange between the portable terminals is also becoming more active.

To exchange data between the portable terminals requires a communication method for connecting the portable terminals with each other. A traditional connection method is a wired communication method. However, this method needs a communication cable, thus causing inconvenience as a user has to carry a communication cable to utilize this service. However, this communication means also has a disadvantage in that the communication cable may become entangled and limit the movement of the user. Thus, a diversity of wireless communication methods (e.g., Bluetooth, Infrared Data Association (IrDA), ZigBee, UltraWideBand (UWB), etc.) have been developed for connection between personal area devices, (i.e., portable terminals) have been commercialized or are under development.

Figure 1:
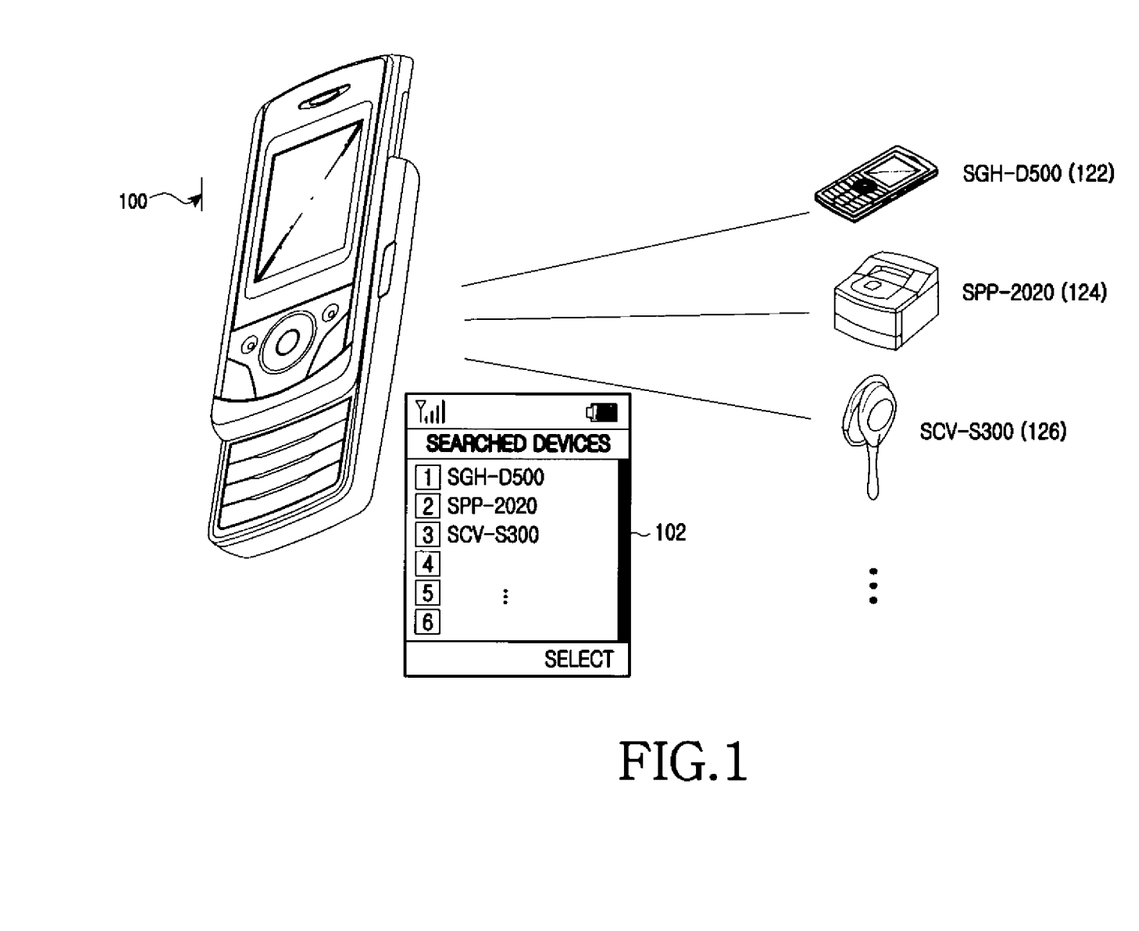
FIG. 1 is a diagram illustrating an exemplary process for device selection within a wireless (i.e., Bluetooth) communication connection in a conventional portable terminal.

FIG. 1 is a diagram illustrating a process of communication connection with a portable device in a conventional portable terminal. FIG. 1 illustrates Bluetooth communication connection among wireless communications, for example. However, it would be recognized that other types of wireless communication systems (e.g., WiFI) may be utilized without altering the scope of the invention.

Referring to FIG. 1, a portable terminal 100 equipped with a Bluetooth (i.e., wireless) module searches neighboring connectable Bluetooth devices 122, 124, and 126 to provide services to the Bluetooth devices 122, 124, and 126. The portable terminal 100 creates a list 102 indicating the searched and detected Bluetooth devices 122, 124, and 126, and selects a Bluetooth device intended for connection in the created list 102.

The portable terminal 100 selects a Bluetooth device for use among the list 102 indicating a neighboring connectable Bluetooth devices 122, 124, and 126 and then, communicates with the selected Bluetooth device, to provide a service corresponding to the selected Bluetooth device.

For example, when a user of the portable terminal 100 intends to connect a Bluetooth headset 126, the portable terminal 100 activates a Bluetooth communication module, searches neighboring Bluetooth devices, and then creates a list 102 of connectable Bluetooth devices. After that, the user selects the Bluetooth headset 126 in the created list 102 of the Bluetooth devices.

A portable terminal supports a plurality of wireless connection methods in order to connect with various portable devices for information exchange. However, there is a problem that, as supported connection methods increase in number, the connection process between the portable terminal and the portable device also increases in complexity.

Hence, when the portable terminal performs communication with a portable device, the portable terminal has to select a communication method and search a portable device supporting the selected communication method. Inversely, even a portable device, at a reception side, performs the same process as the portable terminal, thus being capable of performing communication connection.

As described above, when intending to connect the portable terminal with a portable device, a user has to go through several processes and thus, there is a drawback that user's convenience is deteriorated.

SUMMARY OF THE INVENTION

One aspect of the present invention is to provide an apparatus and method for performing communication with a portable device in a portable terminal.

Another aspect of the present invention is to provide an apparatus and method for simplifying a process of communication connection with a portable device in a portable terminal.

Another aspect of the present invention is to provide an apparatus and method for performing communication connection with a portable device using a human body communication in a portable terminal.

Another aspect of the present invention is to provide an apparatus and method for recognizing a portable device connected through a human body communication in a portable terminal and automatically performing an operation corresponding to the portable device.

The above aspects are achieved by providing an apparatus and method for human body communication in a mobile communication system.

According to one aspect of the present invention, a portable terminal for human body communication is provided. The terminal includes a human body communication module and a controller. The human body communication module performs human body communication. The controller performs a process to perform connection with an external device through the human body communication and then perform an operation executable through the human body communication.

According to another aspect of the present invention, an external device for human body communication is provided. The device includes a human body communication module and a controller. The human body communication module performs human body communication. The controller performs a process to perform human body communication connection with a portable terminal and then, when receiving information for informing an operation to be executed through human body communication, perform the operation.

According to a further another aspect of the present invention, a method for human body communication in a portable terminal is provided. The method includes, after performing human body communication connection with an external device, outputting a list representing an operation executable through human body communication, sensing a selection of an operation intended for execution in the list, and performing the sensed operation.

According to a yet another aspect of the present invention, a method for human body communication in an external device is provided. The method includes performing human body communication connection with a portable terminal, and, when receiving information for informing an operation to be executed through human body communication, performing the operation.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

Embodiments of the present invention will be described with reference to the accompanying drawings. In the following description, well-known functions or constructions are not described in detail since they would obscure the invention in unnecessary detail.

An apparatus and method for performing communication connection with a portable device using a human body communication link in a portable terminal are described.

The human body communication is a technology of realizing a data communication using a human body instead of a communication cable as a transmission medium or link.

In the description of the invention herein, a portable terminal refers to at least one of a cellular phone, a Personal Communication System (PCS) phone, a Personal Data Assistant (PDA), an International Mobile Telecommunication-2000 (IMT-2000), a 4-generation (4G) broadband system terminal, etc. The following description is made on the basis of a general construction of the above examples. In addition, a portable device may also refer to at least one of an external electronic device, such as a Personal Computer (PC), a PDA, and a Portable Multimedia Player (PMP) that can communicate with the portable terminal.

Figure 2:
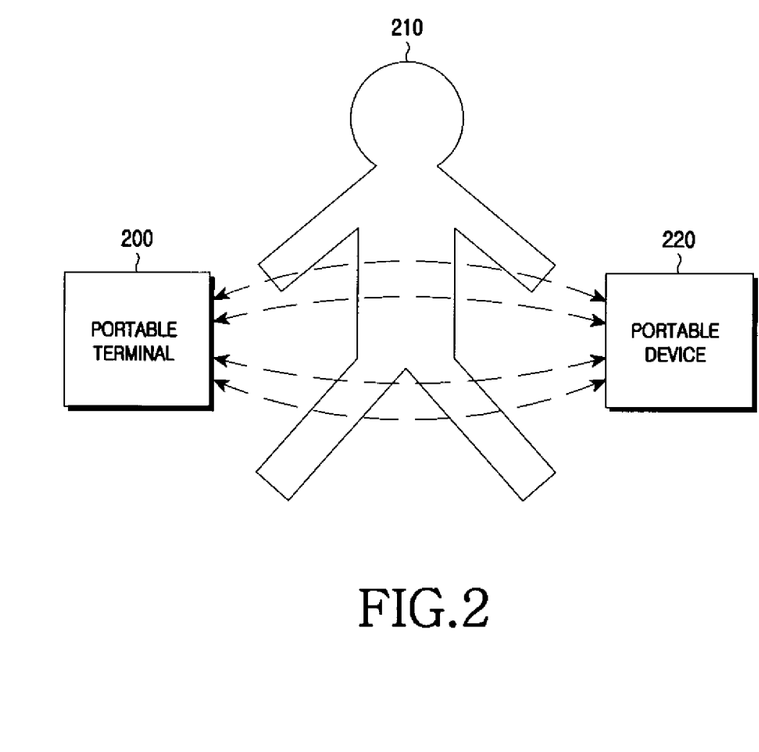
FIG. 2 is a diagram illustrating a process of communication connection through a human body communication medium or link according to an exemplary embodiment of the present invention.

FIG. 2 represents an exemplary process of communication connection through a human body communication link in a portable terminal according to an exemplary embodiment of the present invention.

Referring to FIG. 2, the communication connection process through the human body communication is performed by a portable terminal 200 intended to perform communication, a portable device 220, and a user 210 for connecting the portable terminal 200 with the portable device 220.

The user 210 of the portable terminal 200 attempts a human body communication by bringing the portable terminal 200 and portable device 220 intended for communication connection into contact with human body. In one aspect of the invention, the terminal and/or device may include a sensor that may provide a communication connection to the body. The sensor may establish a physical connection or a non-physical connection, e.g., magnetic, with the body. In another aspect of the invention, the body may be in physical connection with a signal transfer device, e.g., a transceiver, which the terminal or portable device may be in physical or non-physical contact, to transfer data between the terminal and portable device via the body medium. For example, returning to FIG. 1, data may be transferred from device 100 to printer 124 when the user contacts both the device 100 and printer 124.

Thereafter, when selecting an execution operation executable through a process of human body communication link with the portable device 220, the portable terminal 200 performs the selected operation with the portable device 220.

For example, when attempting to transmit data to the portable device, the portable terminal performs a predetermined authentication process and performs data transmission. If attempting to receive data from the portable device, the portable terminal receives specific data from the portable device.

Figure 3:
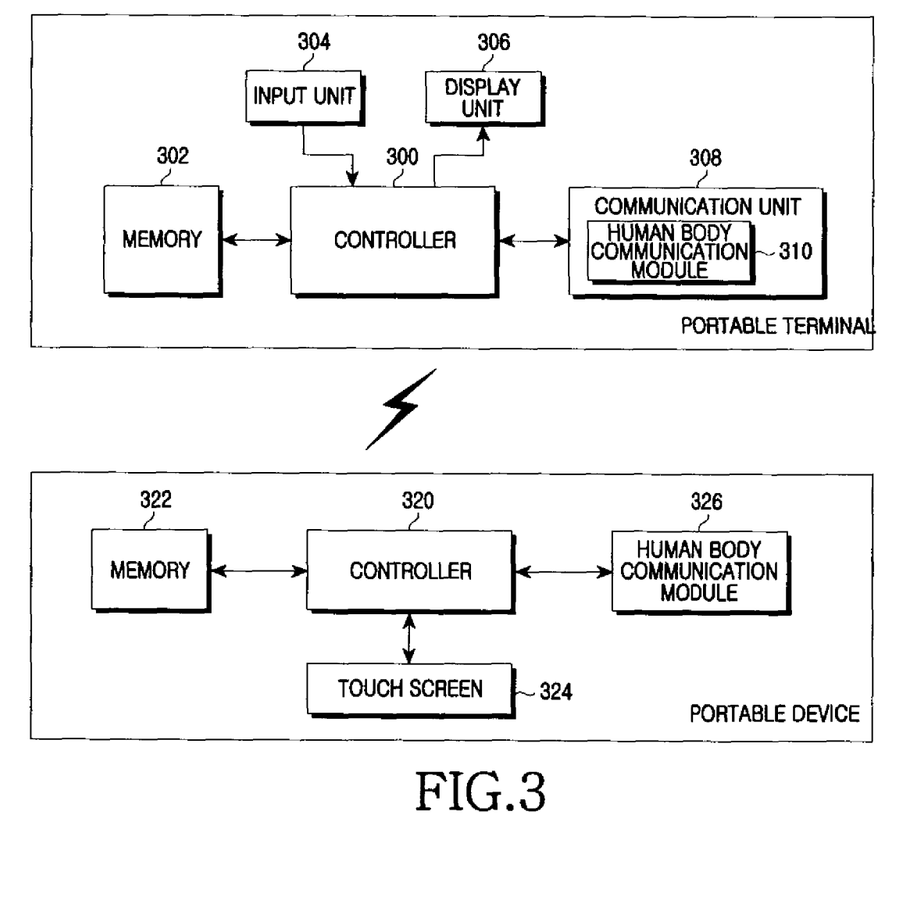
FIG. 3 is a block diagram illustrating block diagrams of a portable terminal and portable device f according to an exemplary embodiment of the present invention.

FIG. 3 represents a block diagram illustrating constructions of a portable terminal and portable device for performing communication connection through a human body communication link according to an exemplary embodiment of the present invention.

Referring to FIG. 3, the portable terminal can include a controller 300, a memory 302, an input unit 304, a display unit 306, and a communication unit 308. The communication unit 308 can include a human body communication module 310.

The portable device can include a controller 320, a memory 322, a touch screen 324, and a human body communication module 326.

The controller 300 of the portable terminal controls the general operation of the portable terminal. In addition to a general function, the controller 300 performs a process to enable communication with the portable device through the human body medium according to an exemplary embodiment of the present invention. In detail, the controller 300 performs a process to establish a communication link with the portable device through the human body medium and then performs data transmission and program control operations. For example, the controller 300 can process a function of receiving information on the portable device, (e.g., an identifier) through the human body communication link and performing an operation corresponding to the received information (e.g., identifier).

The memory 302 of the portable terminal represents a computer readable medium that stores a program (i.e., code or computer instructions) for controlling the general operation of the portable terminal, stores temporary data generated during execution of an operation of the portable terminal, stores a system parameter and other data required for safe-keeping (e.g., identifies). The memory 302 also stores data received from communication with the portable device through the human body medium according to an exemplary embodiment of the present invention. The memory 302 can further store a table representing operations executable with each portable device. For example, the table may contain identifiers of respective portable devices and operations corresponding to the respective identifiers.

The input unit 304 of the portable terminal includes keys for inputting numeral or character information and function keys for setting a variety of different functions, and outputs to the controller 300 indications corresponding to the keys pressed by a user. For example, the input unit 304 may output an indication of a key depression requesting establishment and/or execution of a communication link or a request for data transmission or reception with the portable device, to the controller 300. The display unit 306 of the portable terminal displays information generated during operation of the portable terminal. Upon initiation of human body communication with the portable device, the display unit 306 displays a list representing at least one executable operation according to an exemplary embodiment of the present invention.

The communication unit 308 of the portable terminal can include a Radio Frequency (RF) processor (not shown) and the human body communication module 310. As would be appreciated, the RF processor may be included within the communication module 310.

The RF processor transmits/receives and processes a wireless signal of data input/output through an antenna (not shown). For instance, in a transmission mode, the RF processor transmits data through channel coding and spreading and other types RF transmission processes. In a reception mode, the RF processor converts a received RF signal into a baseband signal, processes the baseband signal through de-spreading and channel decoding, to obtain the received data.

The human body communication module 310 controls the functions of human body communication transmission/reception. The human body communication module 310 communicates with the portable device using at least one electrical signal electrode coupled to human body. The human body communication module 310 furthers forms a return path to the air-ground or earth-ground to configure a closed loop to provide a reference electrical potential. A transmitter and a receiver of the human body communication module 310 can be realized in one portable terminal. A transmitting signal electrode and a receiving signal electrode can be physically realized as one electrode. In the case of using a single signal electrode for the purpose of transmission and reception, information forwarded to the signal electrode is temporally separated depending on transmission or reception (e.g., time division multiplex), or a transmission/reception signal can be transmitted with a frequency band separated (frequency division multiplex).

The controller 320 of the portable device controls a general operation of the portable device. In addition to a general function, the controller 320 performs a process to establish communication with the portable terminal through the human body medium according to an exemplary embodiment of the present invention. In detail, the controller 320 performs a process to establish a communication link with the portable terminal through the human body medium and then perform operations to control data transmission and reception. For example, upon occurrence of human body contact, the controller 320 controls and processes a function of transmitting a specific identifier to a device, that is, a portable terminal coming in contact with the human body. The identifier can be either an identifier representing the portable device or an identifier representing a program that is mapped to a predetermined position of the touch screen 324 coming in contact with the human body. In other words, at a time the human body detects a contact with a specific position of the touch screen 324, the controller 320 controls and processes a function of identifying an identifier corresponding to the specific position touched from memory 322 and transmitting the identified identifier through the human body communication.

The memory 322 of the portable device represents a computer-readable medium that stores a program (i.e., code or computer instructions) for controlling a general operation of the portable device, temporary data generated during execution of the portable device, stores at least one system parameter, and other data required for the operation of the portable device. The memory 322 also stores data received though communication with the portable terminal through the human body according to an exemplary embodiment of the present invention. For example, the memory 322 may store an identifier of the portable device or an identifier of each program mapped to a predetermined position of the touch screen 324.

The touch screen 324 of the portable device recognizes input information input from a user, converts the recognized result into touch screen panel data, and outputs the converted data to the controller 320. The touch screen panel data is comprised of space coordinate data forwarded to the touch screen 324 from the user and state data representing whether the space coordinate data is continuously generated. The touch screen panel data is of a form recognized and processed by the controller 320 of the portable device and may include specific region information input by the user. The touch screen 324 can connect with the human body communication module 326 by covering the outermost of the touch screen 324 with a transparent electrode.

The human body communication module 326 of the portable device controls operations associated with communication transmission/reception through the human body medium. The human body communication module 326 performs communication with the portable device using a variation of electrical potential of at least one signal electrode coupled to human body.

Figure 4:
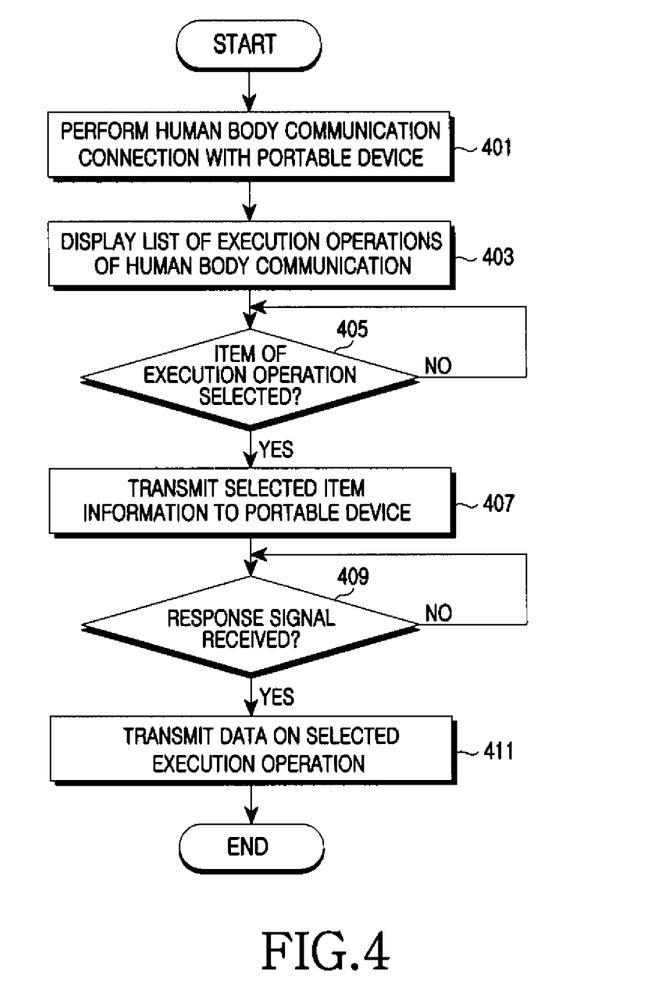
FIG. 4 is a flow diagram illustrating a process within a portable terminal for establishing a communication connection through a human body communication link according to an exemplary embodiment of the present invention.

FIG. 4 is a flow diagram illustrating a process of communication connection through a human body communication medium in a portable terminal according to an exemplary embodiment of the present invention.

Referring to FIG. 4, in step 401, the portable terminal establishes a communication connection, or link, with a portable device though the body medium. The human body communication connection is a technology of realizing a data communication using the human body instead of a communication cable. For example, when transmitting data of the portable terminal to the portable device, a user touches the touch screen 324 of the portable device to perform connection to a folder or application program corresponding to the touched region. At this time, the portable terminal can receive a specific identifier from the portable device through the human body communication.

Then, in step 403, the portable terminal outputs a list of execution operations executable through a human body communication link with the portable device. Then, in step 405, the portable terminal determines if an item that a user of the portable terminal intends to execute is selected among the list of execution operations. For example, by previously storing a table representing identifiers for respective portable devices and operations corresponding to the respective identifiers, the portable terminal can output a list including operations executable with a portable device connected by a human body communication through an identifier. The execution operation list can include an item such as data transmission/reception with the portable device and a program control (e.g., print, music play, etc.) of the portable device.

If an item that a user of the portable terminal intends to execute is selected in step 405, the portable terminal transmits information on the selected item to a corresponding region of the portable device in step 407. The terminal then determines in step 409 whether a response signal is received (i.e., an Acknowledgment) in response to the information on the selected item. If the item is not selected in step 405, the portable terminal again performs step 405. If not receiving in step 409, the portable terminal again performs step 409.

After receiving a response signal in step 409, the portable terminal transmits data on the selected execution operation to the portable device in step 411. Then, the portable terminal terminates the process according to an exemplary embodiment of the present invention.

In cases when there is only a single an operation executable with a associated an identified portable device in step 403, the portable terminal may directly perform the operation corresponding to the received identifier without going through a series of steps of outputting the list (step 403), selecting a specific operation (step 407), and exchanging a signal for the specific operation (step 411).

Figure 5:
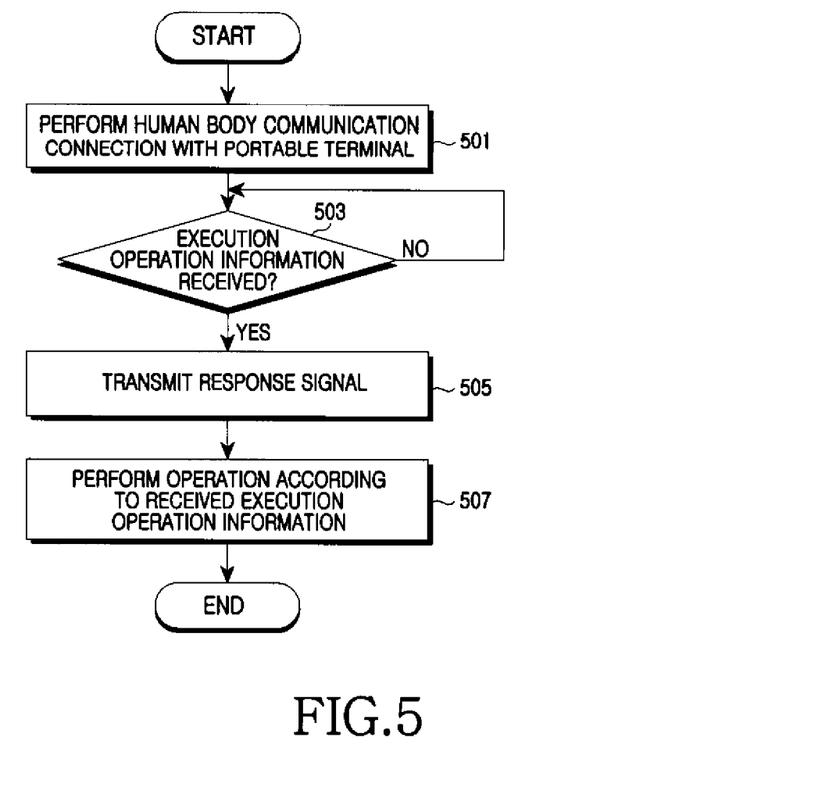
FIG. 5 is a flow diagram illustrating a process within a portable device for establishing a communication connection using a human body communication medium according to an exemplary embodiment of the present invention.

FIG. 5 is a flow diagram illustrating a process of establishing a communication connection or link to a portable device though a human body in according to an exemplary embodiment of the present invention.

Referring to FIG. 5, in step 501, the portable device establishes a human body communication connection with a portable terminal. The human body communication connection or link is the similar to that described with regard to the aforementioned process shown in FIG. 4 and its detailed description is omitted below. At this time, the portable device can transmit a specific identifier to the portable terminal through the human body communication. For example, upon contact with the human body, the portable device can transmit a specific identifier to a different device, that is, a portable terminal also in contact with human body. The identifier may be an identifier representing the portable device or may be an identifier representing a program mapped to a predetermined position of the touch screen 324 coming in contact with human body.

Then, in step 503, the portable device determines whether it receives from the portable terminal information regarding a specific execution operation. The execution operation information may represent information of an operation that a user of the portable terminal intends to execute. The execution operation information can include data transmission/reception, a specific program execution request (e.g., print, music play, etc.), and other similar operations. After receiving information on a specific execution operation from the portable terminal in step 503, the portable device transmits a response signal (Acknowledgment) to the received execution operation information in step 505. If not receiving in step 503, the portable device again performs step 503.

Then, in step 507, the portable device performs an operation according to the received execution operation information and then, terminates the process according to an exemplary embodiment of the present invention.

Figure 6:
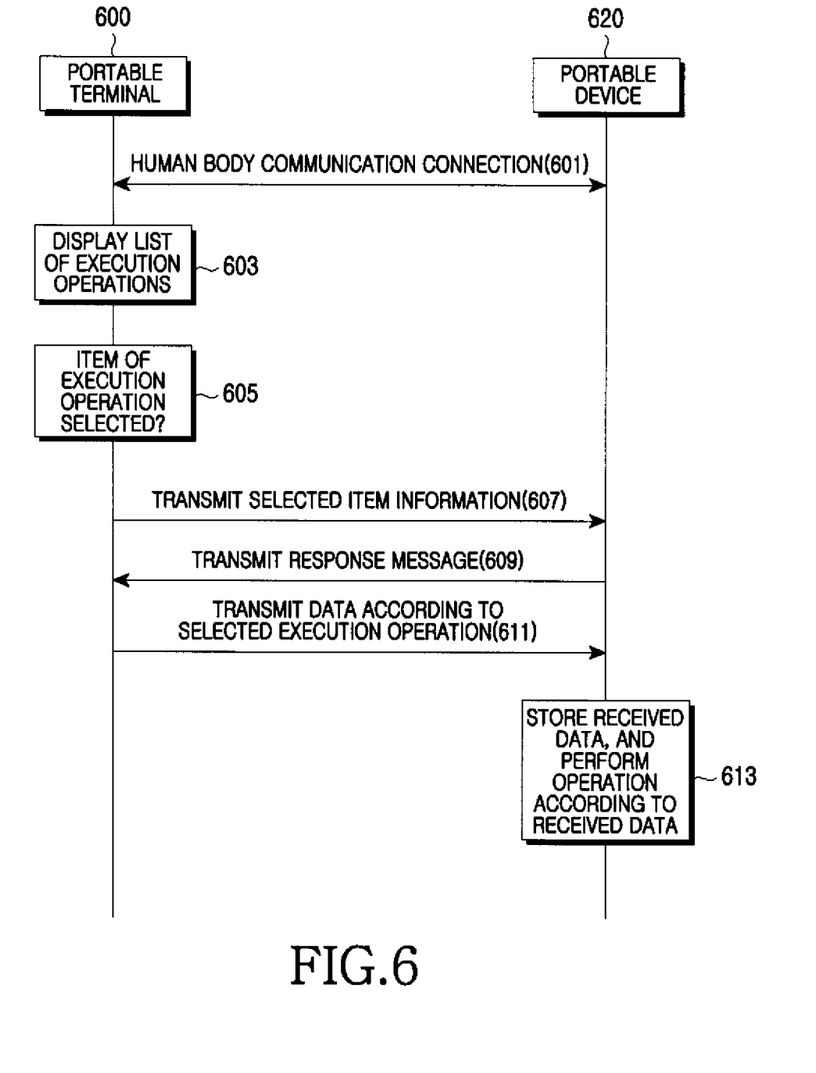
FIG. 6 is a timing diagram illustrating a process of data transmission between a portable terminal and a portable device through a human body communication medium according to an exemplary embodiment of the present invention.

FIG. 6 is a timing diagram illustrating a process of data transmission through a human body communication link between a portable terminal and a portable device according to an exemplary embodiment of the present invention.

Referring to FIG. 6, in step 601, the portable terminal 600 performs a human body communication connection process with the portable device 620. For example, when intending to transmit data of the portable terminal 600 to a specific folder of the portable device 620, a user enables human body communication by holding the portable terminal 600 with his/her hand and touching a specific image, icon or folder on a touch screen of the portable device 620. At a time the user touches a specific portion of the portable device 620 touch screen, the portable device 620 can transmit an identifier mapped to the touched portion to the portable terminal 600 held by the user, and the portable terminal 600 can transmit a response signal to the portable device 620 indicating that it has received the identifier.

In step 603, the portable terminal 600 displays on a display unit a list of execution operations that are executable through a communication link with the portable device 620. For example, by previously storing a table representing an identifier for each portable device 620 and at least one operation corresponding to each identifier, the portable terminal 600 can display a list, including operations executable with the portable device 620, in accordance with the identifier received from the portable device 620.

If a user selects any one item among the displayed list (e.g., "data transmission", "data reception", "print", "music play", etc.) in step 605, the portable terminal 600 transmits information regarding the selected item to the portable device 620 in step 607. For instance, if "data transmission" is selected among the list, the portable terminal 600 transmits information on data transmission to be executed, to the portable device 620.

After the selected item information is received from the portable terminal 600, in step 609, the portable device 620 transmits a response message (i.e., an Acknowledgment) to the portable terminal 600 in response to the received information.

Then, in step 611, the portable terminal 600 transmits data on the selected execution operation to the portable device 620. Then, in step 613, the portable device 620 stores data received from the portable terminal 600 and performs an operation according to the data.

In cases where an operation executable with the portable device is only one in number in step 605, the portable terminal and portable device may directly perform the operation without performing steps subsequent to step 605.

As described above, an exemplary embodiment of the present invention has an effect of being capable of providing a simpler communication connection process than a communication cable connection process that is an existing communication connection process, by performing human body communication at the time of communication connection between a portable terminal and a portable device.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable terminal for human body communication, the terminal comprising:
   a human body communication module configured to establish and perform human body communication link;
   a memory configured to pre-store program identifiers and at least one operation corresponding to the respective program identifiers;
   a display unit; and
   a controller configured to: perform a process to execute connection with an external device having a touch screen through the human body communication link and receive at least a program identifier from the external device through the human body communication link, output to the display unit a list of execution operations executable through the human body communication link and corresponding to the received program identifier, detect a user selection of an execution operation in the list, and perform the selected execution operation via the human body communication link corresponding to the received program identifier;
   wherein the received program identifier indicates an identifier of a program corresponding to a position in which a touch input on the touch screen of the external device is sensed;
   wherein each of the pre-stored program identifiers corresponds to a different position on the touch screen of the external device.

2. The terminal of claim 1,
   wherein the controller performs a process to transmit information on the selected execution operation to the external device.

3. The terminal of claim 1, wherein the execution operations comprise a controlling operation with respect to a program corresponding to the respective program identifier.

4. An external device for human body communication, the device comprising:
   a human body communication module configured to perform human body communication;
   a touch screen configured to sense a touch input;
   a memory configured to store a plurality of program identifiers, each corresponding to a different position on the touch screen; and
   a controller configured to: perform a process to execute human body communication connection with a portable terminal, search for a program identifier of a program corresponding to a position in which a touch input on the touch screen is sensed, and control transmission of the searched program identifier through the human body communication connection, wherein the program identifier corresponds to a plurality of execution operations executable through the human body communication connection and selectable at the portable terminal, then, when receiving information for a selected one of the operations corresponding to the transmitted program identifier, perform the selected operation via the human body connection.

5. The device of claim 4, wherein the execution operation comprises a controlling operation with respect to a program corresponding to the respective program identifier.

6. A method for human body communication in a portable terminal, the method comprising:
   establishing a human body communication connection with an external device with respect to a program corresponding to a position in which a touch input on a touch screen of the external device is sensed;
   searching for operations corresponding to the program from a memory;
   displaying a list of execution operations executable through the human body communication link and corresponding to the program;
   sensing a selection of an execution operation in the list; and
   performing the selected execution operation through the human body communication connection,
   wherein the establishing a human body communication connection with an external device comprises:
   receiving a program identifier from the external device through the human body communication connection, the program identifier corresponding to the position in which the touch input on the touch screen of the external device is sensed.

7. The method of claim 6, further comprising:
   transmitting information on the selected execution operation to the external device; and
   receiving a response to the transmitted information.

8. The method of claim 6, wherein the execution operations comprises controlling operation with respect to a program corresponding to the respective program identifier.

9. A method for human body communication in an external device having a touch screen, the method comprising:
   performing human body communication connection with a portable terminal with respect to a program corresponding to a position in which a touch input on a touch screen of the external device is sensed;
   receiving information from the portable terminal for an operation corresponding to the program; and
   performing the operation through the human body communication connection;
   wherein the performing human body communication connection comprises sensing a touched position of the touch screen of the external device; and transmitting a program identifier of a program corresponding to the touched position to the portable terminal through the human body communication connection;
   wherein the program identifier corresponds to a plurality of execution operations executable through the human body communication connection and selectable at the portable terminal.

10. The method of claim 9, wherein the execution operations comprise a controlling operation with respect to a program corresponding to the respective program identifier.

11. The portable terminal of claim 1, wherein human body communication link is performed via an electrode, which is coupled to a human body to form a return path to configure a closed loop.

12. The device of claim 4, wherein human body communication link is performed via an electrode, which is coupled to a human body to form a return path to configure a closed loop.

13. The method of claim 6, wherein the human body communication connection is established via an electrode, which is coupled to a human body to form a return path to configure a closed loop.

* * * * *